United States Patent [19]

Brush et al.

[11] Patent Number: 4,760,471
[45] Date of Patent: Jul. 26, 1988

[54] SYSTEM AND METHOD TO IMPROVE PICTURE QUALITY DURING SHUTTLING OF VIDEO TAPES

[75] Inventors: Richard K. Brush; John P. Watney, both of Los Altos, Calif.

[73] Assignee: Ampex Corporation, Redwood City, Calif.

[21] Appl. No.: 851,067

[22] Filed: Apr. 11, 1986

[51] Int. Cl.[4] .............................................. H04N 5/783
[52] U.S. Cl. .................................. 360/10.2; 360/10.3; 360/77; 360/73; 360/70; 360/14.1
[58] Field of Search ...................... 360/10.2, 10.3, 77, 360/DIG. 1, 73, 70, 78, 14.1, 14.2, 14.3

[56] References Cited

U.S. PATENT DOCUMENTS

| | | | |
|---|---|---|---|
| 3,663,763 | 5/1972 | Trost | 179/100.2 T |
| 4,151,570 | 4/1979 | Ravizza et al. | 360/77 |
| 4,152,734 | 5/1979 | Louth | 360/70 |
| 4,163,993 | 8/1979 | Ravizza | 360/10 |
| 4,233,637 | 11/1980 | Kubota | 360/77 |
| 4,486,796 | 12/1984 | Sakamoto | 360/77 |
| 4,550,349 | 10/1985 | Okuyama | 360/77 |
| 4,590,523 | 5/1986 | Honjo | 360/77 |

OTHER PUBLICATIONS

"The Development of the Ampex AST System", by Mark Sanders, Video Systems, Apr. 1980, pp. 46-53.
"Development and Design of the Ampex Auto Scan Tracking (AST) System", by Richard A. Hathaway, et al, SPMTE Journal, vol. 89, Dec. 1980, pp. 931-934.

Primary Examiner—Alan Faber
Attorney, Agent, or Firm—Robert E. Krebs; Richard P. Lange; Ralph L. Mossino

[57] ABSTRACT

A system to improve image quality during shuttling of a video tape in a record and playback machine of the type in which each image field is recorded on one or more tracks on video tape. The system includes an offset signal source coupled to a displaceable mechanism during shuttling to provide relative displacement between a reproduce transducer and a video tape to cause the transducer to cross tracks of recorded information irregularly, thereby providing frequent updating of substantially all regions of an image field by information stored on the tape.

28 Claims, 2 Drawing Sheets

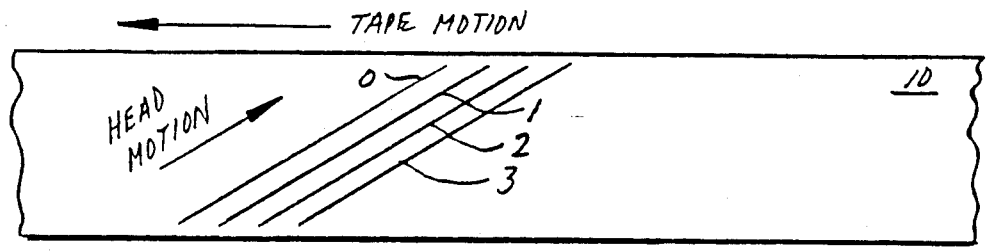
FIG._1A
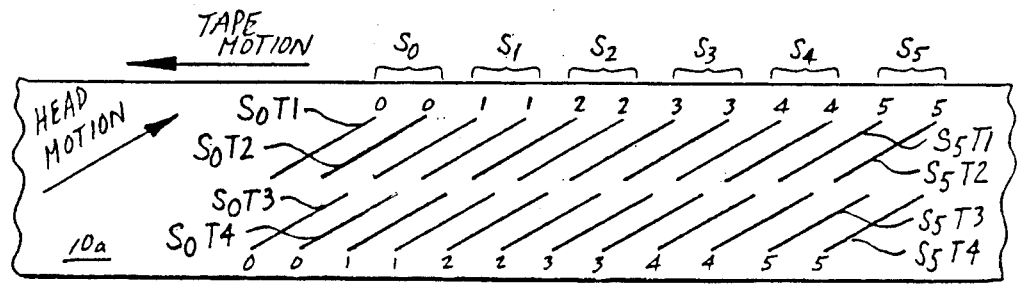
FIG._1B
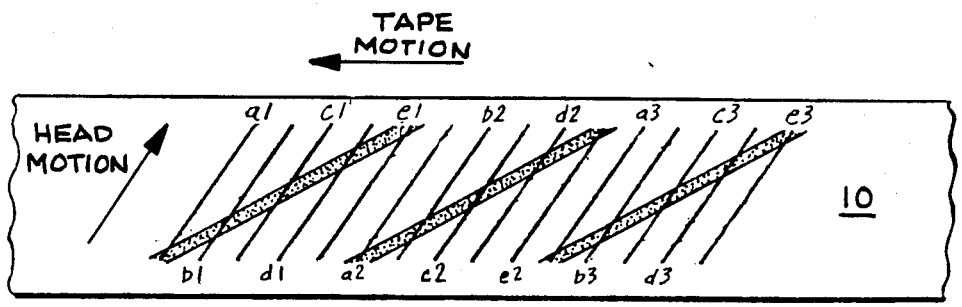
FIG._2
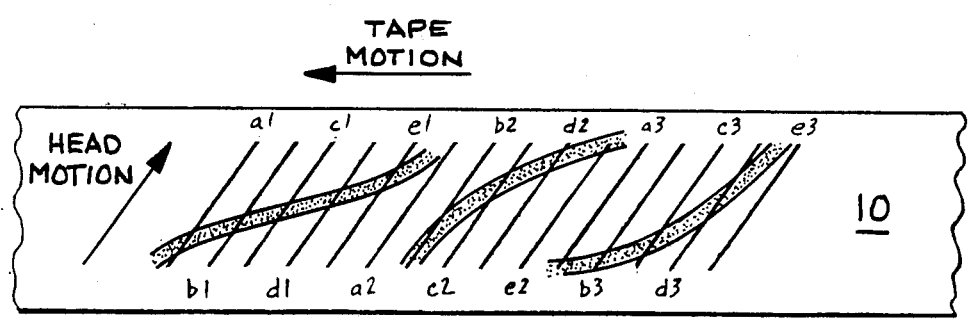
FIG._4

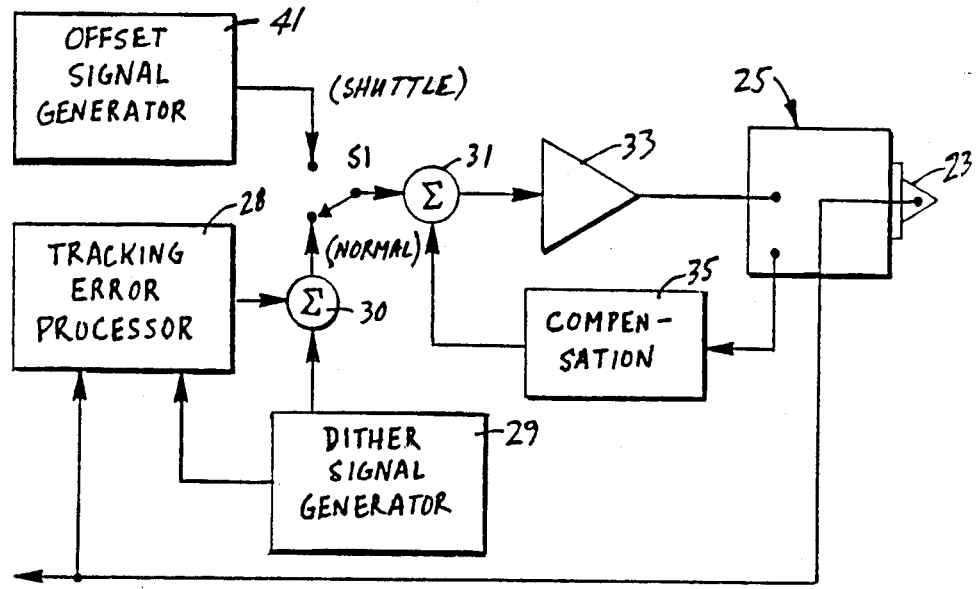
FIG._3
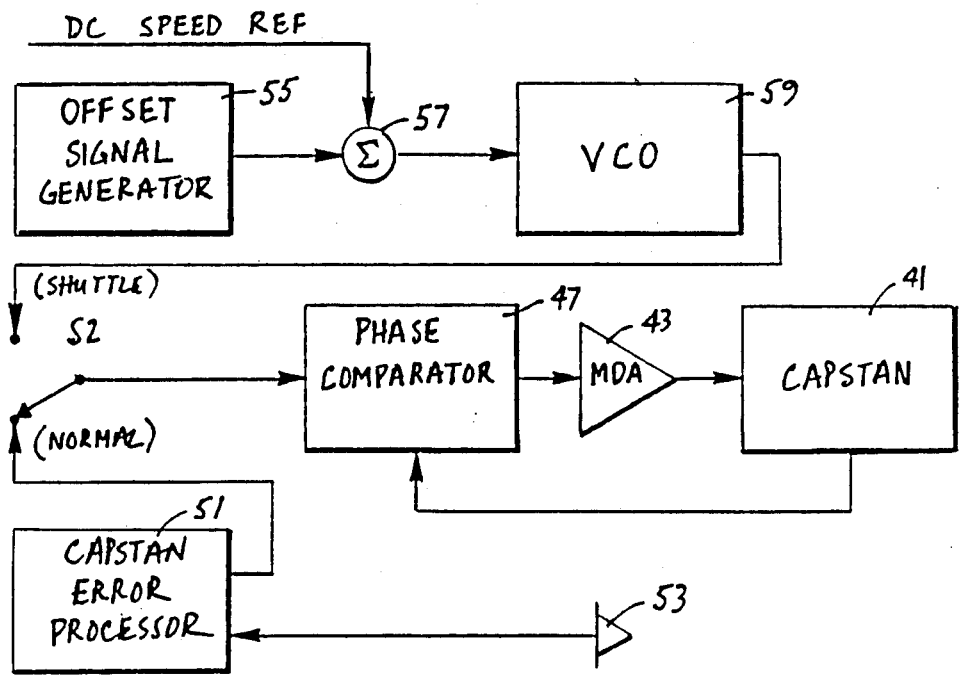
FIG._5

SYSTEM AND METHOD TO IMPROVE PICTURE QUALITY DURING SHUTTLING OF VIDEO TAPES.

The present invention generally relates to magnetic recording and reproducing systems for video tapes and, more specifically, to improvements in such systems to provide high quality images during shuttling of video tapes.

In the field of video tape recording technology, the term "shuttling" is utilized to describe movement of a video tape from one reel to another across an electromagnetic transducing head at speeds exceeding the speed at which recordings are normally recorded and read; more specifically, shuttling usually refers to movement of a video tape at speeds in excess of the speed at which a read transducer is capable of precisely tracking magnetic tracks of information written upon a video tape. Typically, tape transport speeds exceeding three times normal in the forward direction or exceeding twice normal in the reverse direction are said to be shuttling speeds.

Shuttling is typically utilized when there is a need to quickly scan information stored on a video tape, or when there is a need to search a video tape for particular information, or when there is a need to edit a video tape. During shuttling, it is desirable video signals be provided of sufficient quality to provide visual displays with minimal observable disturbances therein. In early technology, images reproduced from video tapes during shuttling were ambiguous or unrecognizable. Such lack of quality of reproduced images arose not only because shuttling increases the apparent rate of motion of objects recorded on video tape, but also because of the design of the recording and reproducing equipment itself. In recent years, efforts have been made to improve image quality during video tape shuttling; the ultimate goal is to provide the same image quality during shuttling as is provided during normal-speed operation of video tape recording and reproducing machines.

One cause of poor image quality during video tape shuttling replay is that, at certain shuttle speeds, certain areas of reproduced images may not be updated as frequently as others. To understand the cause of infrequent updating, certain principles of operation of modern video tape recording and playback machines must be kept in mind. Thus, it should be understood that when a video tape is read by a transducer of a recording and reproducing machine to replay images on the screen of a cathode-ray tube (CRT), the resulting image or "picture" comprises a display of a set of data points or samples, sometimes referred to as pixels, whose quality on the CRT screen persists only when the data samples are frequently updated. Areas of an image which are infrequently updated may be referred to as "stale" areas. In some instances, stale areas are manifest as bands or stripes across an image field; in other instances, stale areas may appear to be randomly distributed spots or clusters. In any case, stale areas detract from visual quality. Stale areas usually occur because a read transducer, at certain shuttle speeds, begins crosstracking from data track to data track on the video tape in a periodic manner such that certain portions of certain data tracks are systematically unread or infrequently read.

Although video information stored magnetically on tape is most often utilized for television viewing, such information can provide video images for other purposes. For example, it is well known to store video information on tape for radar applications and for medical diagnosis. Accordingly, video tape can have diverse applications wherein video information is magnetically stored on a tape medium.

One effort to improve image quality during shuttling replay has involved providing additional transducing heads to detect and read magnetic information on video tape. With additional transducers, an increased area of video tape is read during shuttling thereby increasing the number of track portions read and, consequently, reducing the frequency of occurrence of stale areas. A drawback of such an approach, however, is that additional transducers and associated control circuitry can add substantial cost and complexity to video recording and playback equipment.

During normal-speed replay of information from a video tape, the tape must be transported relative to a transducing read head in a manner such that the head can readily follow tracks of magnetic information recorded on the tape. To enhance the ability of a read head to follow information tracks, some video tape replay equipment utilizes servo systems to controllably displace a transducing read head as a track of magnetic information passes the head. One such servo system is known as an automatic head positioning and tracking system and is incorporated in video tape record and reproduce apparatus provided by Ampex Corporation of Redwood City, Calif. In a typical system of this type, a read head is mounted on a support structure having piezoelectric properties such that the position of the head can be readily deflected by applying servo-controlled voltage to the support structure. Systems of this type are described in an article entitled "Development and Design of the Ampex Auto Scan Tracking (AST) System", appearing in the *SMPTE Journal* (Vol. 89) December 1980; in an article entitled "The Development of the Ampex AST System" appearing in *Video Systems*, April 1980; and in U.S. Pat. No. 4,151,570 entitled "Automatic Scan Tracking Using a Magnetic Head Supported by a Piezoelectric Bender Element".

In automatic head positioning and tracking systems, a technique known as "dithering" can be used to assist in determining positional tracking errors during tracking. (A tracking error can be defined as a deviation between the actual position of a read head and the centerline of a magnetic data track along which the head is intended to travel.) Conventional dithering techniques involve deflecting a read head in a sinusoidally oscillating manner to move the head slightly from the centerline of a data track and thereby to provide an amplitude-modulated carrier signal at the dither frequency. For example, when a read head passes through the centerline of a track of information, the output of the head is a maximum and thereafter diminishes as the head moves to either side of centerline. The modulated carrier signals provided as output from a read head, therefore, contain information regarding the position of the head relative to the track. Upon processing of the carrier signals, a servo signal is generated which indicates both amplitude and direction of head positioning errors. In practice of such automatic head positioning and tracking systems, the amplitude of dither signals is such that head deflection does not exceed track width.

Systems for automatically aligning video tape relative to a transducing head in a record and playback machine of the type using a capstan drive are also well known.

For example, one such system is taught in U.S. Pat. No. 3,663,763 assigned to Ampex Corporation. In such systems, signals indicative the degree of misalignment between a recorded track on a video tape and a transducing read head can be generated by selectively perturbing the tape slightly in a dither-like manner by means of the capstan in order to provide an amplitude modulated tracking signal. The tracking signals are detected and utilized to generate error signals representative of misalignment between the track and a read head. If an error signal exceeds a predetermined value, capstan velocity is altered to move the video tape in a direction which tends to improve alignment between a track and a read head. In such capstan systems, as in automatic head positioning and tracking systems, the amplitude of the dither-like signals is such that perturbations of the video tape does not exceed a relatively small percentage of track width.

In view of the state of the art, a primary object of the present invention is to provide a system and method for improving image quality during shuttling replay of video tapes.

More specifically, an object of the present invention is to provide a system and method for updating data input points which provide video images during shuttling replay of video tapes in record-and playback machines of the type in which each image field is recorded on one or more tracks on a video tape.

In accordance with the foregoing objects, the present invention generally provides a system wherein a signal source is utilized to cause movement of a transducing read head relative to magnetic tracks of information on video tape such that the transducing read head crosses the information tracks irregularly.

The present invention also provides a method for improving image quality during shuttling of a video tape in record and playback machines. In one embodiment, the method generally includes generating time varying signals during shuttling and, in response to the signals, to cause displacement of a reproduce transducer relative to the tape so that the transducer crosses tracks of magnetic information on video tape in a manner to provide frequent updating of substantially all regions of an image field produced from information stored on the magnetic tracks. Such frequent updating can be achieved by driving a displaceable member carrying the transducer, or equivalent device that causes relative movement of the reproduce transducer and tape, so that a random or random like pattern of track crossings is obtained as the tape is scanned successively by the transducer.

The present invention is suited for video tape record and playback systems of the type having selectively displaceable reproduce transducers or for systems wherein relative displacement between a video tape and a transducing head is accomplished, for example, by varying the rotation of a rotatable capstan instead of directly displacing a transducing head. The present invention is particularly suited to video record and playback machines wherein information is processed by digital electronic techniques, regardless of whether the video information is initially stored on tape in digital or analog form.

The preceding and other objects of the present invention will be readily understood in light of the following description and appended drawings, which are illustrative of preferred embodiments of the invention.

FIG. 1A is a schematic view of a video tape having information magnetically recorded thereon in a relatively simple pattern;

FIG. 1B is a schematic view of a video tape having information magnetically recorded thereon in a pattern relatively more complex than the pattern in FIG. 1A;

FIG. 2 is a schematic view of a portion of the video tape of FIG. 1A indicating the path of travel of a reproduce head relative to the tape during shuttling operations;

FIG. 3 is a block diagram schematically showing components of one embodiment a system according to the present invention;

FIG. 4 is a schematic view of the video tape of FIG. 1A indicating an example of the travel path of a reproduce transducing head controlled by the system of FIG. 3; and FIG. 5 is a block diagram schematically showing components of another embodiment of a system according to the present invention.

The environment of the present invention may be appreciated by referring to FIG. 1A, which shows a section of video tape 10 whose forward direction of motion through a record and playback machine during shuttling is indicated by the horizontal arrow labeled "Tape Motion", parallel to the longitudinal centerline of the tape. An array of parallel tracks of magnetically recorded information 0, 1, 2, etc., extend across the tape diagonally to its centerline. The data tracks 0, 1, 2, etc., shown in FIG. 1A can, for example, be recorded during transport of a video tape in a helix around a cylindrical drum guide and a head rotating about the axis of the drum guide. Included in the information recorded along tracks 0, 1, 2, etc., is data required to faithfully replicate recorded images on a CRT device. Thus, a CRT screen can be considered to display a set of horizontal lines comprised of an ordered set of luminescent points each of which is controllably varied according to data sample information magnetically stored on the magnetic tracks 0, 1, 2, etc. of video tape 10. The totality of the displayed information determines the quality of an image appearing on the CRT screen.

Various formats for recording data on video tape are well known. In some recording formats, a complete video field is recorded upon a single track and in other formats, a video field is recorded on multiple tracks. The latter formats are usually referred to as segmented formats, and each segment comprises a number of horizontally extending lines corresponding to a separate vertical display region in a video field. In one particular segmented format, for example, each segment contains fifty lines from a video field. It is also known to distribute video data for each segment among a plurality of channels and to record each channel on a different track; in one well known format, for example, four channels are provided. Thus, FIG. 1B shows a video tape 10a on which information recorded for a single field is divided into five segments (labelled S0, S1, S2, etc.) and the data in each segment is divided among four channels, each recorded on a separate track. In FIG. 1B, the four tracks comprising four channels for segment S are labelled S1T1, S1T2, S1T3, and S1T4, respectively.

With reference now to FIG. 2, operation of a reproduce transducing head during shuttling will be described. In FIG. 2, it should be assumed that tracks of information a1, b1, . . . a2, b2, etc. have been recorded upon tape 10 which is undergoing shuttling at a generally constant speed in the direction indicated by the horizontal arrow, labeled "Tape Motion". Further, it should be assumed that tracks a1, a2, etc. all represent the same segment of an image field, that track b1, b2, etc. all represent another segment of the image field, and so forth for the "c", "d" and "e" tracks. The path of travel of a transducing head relative to tape 10 is schematically indicated by the bands which extend diagonally to the information tracks. Under such conditions, portions of information tracks read by the transducing head at a particular shuttling speed are encompassed within each band. In the example shown for constant speed operation, the transducing head would pass across the lower portion of track a1, then would move across middle portions of tracks b1 and c1, and then would pass across upper portions of track d1 and e1. For a given pattern of tracks recorded along the tape 10, there will be certain velocities of tape transport that result in a coherence between the patterns of tracks and the pattern of head passes across the tracks. This coherence results in the head (or heads) repeatedly passing over the corresponding locations of tracks upon successive scans of the tape by the head, whereby certain portions of tracks are reproduced frequently while other portions of tracks are reproduced infrequently or not at all. For example, with the pattern shown in FIG. 2, a transducing head would not read the upper portions of the set of tracks a1, a2, a3, etc, nor the lower portions of the set of tracks c1, c2, c3, etc. Whereas the pattern of head passes relative to the tracks illustrated in FIG. 2 repeats every scan of the tape 10 by a head, it should be appreciated that a coherence between the pattern of tracks and the pattern of head passes could exists wherein the pattern of head passes relative to the tracks would repeat after a plurality of scans of the tape by a head. Regardless of the number of head passes relative to the tape over which the pattern of head passes repeats, certain portions of the recorded tracks may not be reproduced or reproduced infrequently, which creates upon display of the reproduced information regions of displayed information that becomes stale.

A system to provide improved images during shuttling is illustrated in FIG. 3. In the system of FIG. 3, a transducing head 23 is mounted for controlled movement upon a deflectable supporting structure 25. Preferably, the deflectable supporting structure 25 is a piezoelectric element as described hereinabove, but, alternatively, can comprise a conventional voice coil device. In the system of FIG. 3, transducing head 23 is connected to provide electrical signals to a tracking error processor 28. The function of tracking error processor 28 is to determine deviations in the position of transducing head 23 relative to the centerline of a track of information on tape 10 and, further, to generate position correcting signals based upon detected deviations. Such tracking error processors are well known for automatic head positioning and tracking The system of FIG. 3 further includes a dither signal generator 29 whose output is provided to tracking error processor 28 and to a summing circuit 30. The summing circuit 30 also receives output signals from tracking error processor 28. Dither signal generator 29 is a conventional oscillator which provides sinusoidal signals at frequencies, for example, of about 425 to about 525 hertz. The magnitude of the dither signals provides slight positional deflection of head 23 from track centerline, and, in practice, typically comprises about 10 percent amplitude modulation of the envelope formed by the reproduced information.

At summing circuit 30, the dither signals are summed with the output signals of tracking error processor 28. The dither signals which are transmitted directly to tracking error processor 28 are used as reference signals. From summing circuit 30, output signals are carried through switch S1 to a second summing circuit 31. The output of summing circuit 31 is provided to a deflector driver 33 which, in turn, provides position determining signals to deflectable supporting structure 25. Deflector driver 33, in practice, is a conventional amplifier.

Also, in the system shown in FIG. 3, a compensation subsystem 35 is connected between deflectable supporting structure 25 and second summing circuit 31. Compensation subsystem 35 provides damping and stability to overcome ringing and other natural vibration properties of deflectable support structure 25. A suitable compensation subsystem is described in the articles mentioned previously herein.

Switch S1 in the system of FIG. 3 is selectively moveable between two positions. In the first position, switch S1 connects tracking error processor 28 to summing circuit 31. The resulting network is an automatic positioning and tracking system comprised of deflector driver 33, deflectable supporting structure 25, tracking error processor 28, and dither signal generator 29. In the second position of switch S1, tracking error processor 28 is open circuited and an offset signal generator 41 is connected to summing circuit 31. Offset signal generator 41 can have various embodiments and can, for example, comprise a conventional voltage controlled oscillator which generates sinusoidal signals up to a frequency of several hundred hertz. Alternatively, offset signal generator 41 can be an oscillator which generates a sinusoidal signal, or filtered noise, or a signal, such as a sinusoidal signal, modulated (AM, PM, or FM) by a random or pseudo-random signal. The magnitude of the signals provided by offset signal generator 41 is normally sufficient to cause deflection of reproduce transducing head 23 by a distance at least equal to the width of several tracks in either direction relative to track centerline. Offset signal generator 41 can be the type of oscillator whose output phase or amplitude, or both, can be controllably varied.

Operation of the system of FIG. 3 will now be described. During normal speed playback, switch S1 is in the first position and, accordingly, deflectable support structure 25 is controlled by the automatic positioning and tracking servo system including tracking error processor 28 and dither signal generator 29. During shuttling, however, switch S1 is placed in the second position such that the output of offset signal generator 41 is connected to summing circuit 31. Thus, in the second position of switch S1, output signals from offset signal generator 41 are summed with signals from compensation subsystem 35, with the result that deflector driver 33 causes movement of deflectable support structure 25 and transducing head 23 in response to the offset signals.

FIG. 4 shows an example of behavior of transducing head 23 resulting from the influence of offset signal generator 41 during shuttling operation of the system of FIG. 3. For purposes of understanding FIG. 4, it should be assumed that video tape 10 is driven at shuttling speed and that portions of information tracks a1, b1, etc. read by a transducing head are encompassed by the curvilinear bands. The pattern of head travel shown in FIG. 4 can be generally characterized as irregular or nonperiodic; that is, transducing head 23 does not periodically read the same portions of tracks a1, a2, a3, etc., nor of the tracks b1, b2, etc. The result of such non-periodic movement of a transducing head relative to the information tracks during shuttling is to minimize stale areas in image fields, because particular portions of the tracks of information are not systematically unread, or only infrequently read. Stated somewhat differently, non-periodic movement or modulation of the reproduce head during shuttling alters track crossing behavior to increase the diversity of data sample input points which are updated in a video image field, thereby providing a more uniform display of video information reproduced during shuttling and improving image quality.

FIG. 5 shows a system for providing video images during shuttling of a video tape in a record and playback machine of the type employing a capstan mechanism 41 to control tape transport. That is, the system of FIG. 5 operates in conjunction with a record and playback machine not necessarily employing a displaceable transducing head or an automatic head positioning and tracking system. Capstan mechanism 41 includes a motor (not separately shown) which rotatably drives a capstan to transport tape across one or more transducing heads (not shown). Connected to capstan mechanism 41 is a motor drive amplifier 43 whose output determines the rotation of capstan mechanism 41. Input signals to motor driver amplifier 43 are generated by a phase comparator subsystem 47. Input signals to phase comparator 47 include signals from capstan mechanism 41 and signals from a capstan error processor subsystem 51. The function of capstan error processor 51 is to determine deviations in the position of a control track read head 53 relative to control track information recorded along the video tape and, further, to generate position correcting signals. Capstan error processor 51 can be, for example, the type of subsystem shown and described in U.S. Pat. No. 3,663,763. The signals from capstan error processor 51 reach phase comparator 47 through a switch S2 when that switch is in its first position. The network comprised of capstan mechanism 41, motor driver amplifier 43, phase comparator 47, and tracking error processor 51 comprises a tracking servo system.

Further, in the system in FIG. 5, an offset signal generator 55 is coupled to a summing circuit 57 which also receives DC reference signals indicative of the rotational velocity of capstan mechanism 41. Offset signal generator 55 in FIG. 5 is generally the same device as offset signal generator 41 in FIG. 3. In practice, however, the output frequency of signals from offset signal generator 55 is on the order of several tens of hertz. Output signals from summing circuit 57 are provided to a voltage controlled oscillator 59 whose output is available at switch S2. In its second position, switch S2 connects the output of voltage controlled oscillator 59 to phase comparator 47.

Operation of the system of FIG. 5 will now be described. During normal speed operation of the system, switch S1 is in the first position and, thus, capstan mechanism 41 is controlled by the tracking system including capstan error processor 51. During shuttling, however, switch S2 is placed in the second position. In the second position, phase comparator 47 receives output signals from voltage controlled oscillator 59 and, thus, the rotational velocity of capstan mechanism 41 is caused to vary in response to signals from offset signal generator 55. As a result of operation of capstan mechanism 41, the transport speed of video tape is varied and, in the associated record and playback machine, reproduce video heads are caused to cross tracks of magnetic information generally irregularly. Accordingly, the system of FIG. 5 also improves video quality during shuttling by providing frequent updating of substantially all regions of an image field. As previously described with reference to the embodiment of the present invention illustrated in FIG. 3, the offset signal generator can be arranged to provide various forms of signals to effect an irregular pattern of cross tracking by the reproduce head. A randomly or pseudo randomly varying signal has the advantage of establishing an irregular pattern of cross tracking at any shuttle speed, because a condition of coherence between the pattern of tracks and the pattern of head passes across the tracks will not exist at any tape speed. Pseudo random signals will have periodicity. However, the length of the period of such signals will be such that in the short term its statistical properties appear random in nature. For purposes of the present invention, a pseudo random signal having a period of one minute or more will produce the desired irregular pattern of track crossings at any tape shuttle speed. Even a period of a few seconds will likely produce the desired irregular pattern of track crossings, since instabilities in tape and head transport conditions that typically exist in magnetic tape record and reproduce apparatus are likely to prevent establishment of long term coherence between the patterns of tracks and the pattern of head passes across the tracks.

Although the present invention has been described with particular reference to the illustrated embodiments, such disclosure should not to be interpreted as limiting. Various modifications and alternative embodiments will no doubt become apparent to those skilled in the art after having read the disclosure. For example, workers skilled in the art may recognize that offset signals in accordance with the preceding disclosure can be provided to a rotatable scanner during shuttle to achieve an effect similar to applying offset signals to a capstan mechanism. Moreover, offset signals may be applied to tape transport systems which employ vacuum column tape buffers to control transport of video tape across transducing heads. Further, as previously mentioned, offset signals can be applied to moveable head mounting structures such as electromagnetic voice coils. In view of such alternatives, the appended claims should be interpreted as covering various alternatives, modifications and embodiments as fall within the true spirit and scope of the present invention.

What is claimed is:

1. A system for providing video images during shuttling of a videotape in recording and playback machines of the type in which each video image field is recorded on one or more tracks on videotape at an angle to the centerline of the tape, comprising:

a transducer controllable to follow and read tracks of information recorded upon a videotape at an angle to the centerline of the tape;

deflectable means coupled to the transducer for operation during shuttling; and offset signal generating means coupled to the deflectable means only during shuttling to provide signals that deflect the deflectable means relative to said tracks of information on the videotape sufficiently to cause the transducer to cross said tracks of information generally non-periodically.

2. A system as defined in claim 1 further including switch means to prevent signals from said offset signal generating means from reaching the displacement means except during shuttling.

3. A system as defined in claim 1 wherein the offset signal generating means generates output signals which are sinusoidal-like.

4. A system as defined in claim 1 wherein the offset signal generating means provides output signals of sufficient amplitude to cause displacement of the transducer by a distance exceeding the perpendicular distance between adjacent ones of said magnetic tracks.

5. A system as defined in claim 1 wherein the displacement means causes the transducer to move back and forth relative to the centerlines of said magnetic tracks of information at frequencies exceeding several hundred hertz.

6. A system for providing video images during shuttling of videotape in a video record-and-playback machine of the type in which a video image field is recorded on one or more tracks on the videotape comprising:

a transducer to read magnetic tracks of information recorded upon a videotape;

deflectable supporting means coupled to movably support the transducer relative to the tape;

tracking means to provide tracking control signals to said deflectable supporting means to cause the transducer to follow individual ones of said magnetic tracks of information;

offset signal generating means for generating time-varying signals; and switch means operable, upon initiation and during shuttling, to prevent said tracking control signals from the tracking means from being provided to the deflectable supporting means and to provide, at all times during shuttling, said time-varying signals to the deflectable supporting means to cause the transducer to cross said tracks of magnetic information generally non-periodically, thereby to provide frequent updating of an image field by data samples from information stored on magnetic tracks on the videotape.

7. A system as defined in claim 6 wherein the offset signal generating means generates output signals which are sinusoidal-like.

8. A system as defined in claim 6 wherein the offset signal generating means provides output signals of sufficient amplitude to cause displacement of the transducer by a distance exceeding the distance between adjacent ones of said magnetic tracks.

9. A system as defined in claim 7 wherein the offset signal generating means provides output signals whose frequency exceeds several hundred hertz.

10. A system as defined in claim 6 wherein the offset signal generating means provides output signals which are irregular in amplitude and frequency.

11. A system for providing images during shuttling in a record-and-playback machine of the type in which each video image field is recorded on one or more tracks on videotape at an angle to the centerline of the videotape, comprising:

(a) offset signal generating means for generating time-varying signals;

(b) a transducing read head which reads magnetic tracks of information recorded upon a videotape;

(c) a capstan mechanism mounted for rotation to transport a videotape across the transducing read head; and (d) tracking error processor means operable for detecting deviations in the position of the transducing read head relative to the centerlines of tracks on the videotape and for generating position-correcting signals based upon the deviations;

(e) switch means to prevent signals from the tracking error processor means from reaching said capstan mechanism during shuttling while connecting the offset signal generating means to the capstan mechanism during shuttling to provide changes in the rotational velocity of the capstan mechanism in response to said time-varying signals sufficient to cause the transducing read head to cross said tracks of magnetic information generally irregularly, thereby to provide frequent updating of video image fields from information stored on videotape.

12. A system as defined in claim 11 further including: capstan servo means connected to receive position-indicating signals.

13. A system as defined in claim 12 wherein the offset signal generating means provides output signals at frequencies exceeding about 10 hertz and at amplitudes sufficient to cause video tape to be displaced relative to the reproduce transducing head by distances exceeding the widths of said magnetic tracks.

14. A method for providing a relatively uniform display of video images during shuttling in a videotape record-and-playback machine of the type in which each image field is recorded on one or more magnetic tracks of information on videotape and read from the videotape by a transducing head, said method comprising the steps of:

(a) generating time-varying signals;

(b) only during shuttling, utilizing said time-varying signals to alter the velocity of videotape relative to a transducing read head sufficiently to cause the transducing read head to cross tracks generally nonperiodically to provide frequent updating of substantially all regions of an image field produced from information stored on the magnetic tracks, thereby to provide a relatively uniform display image.

15. A method as defined in claim 14 further including the step of, during tape transport shuttling, blocking output from systems for servo tracking of the transducer relative to the tape.

16. A method as defined in claim 15 wherein said time varying signals provide displacement of said transducer, and thereby, alter the relative transducer to tape transport.

17. A method as defined in claim 16 wherein the frequency of said time varying signals exceeds several hundred hertz and the amplitude of said signals is sufficient to alter the position of the transducer relative to the tape by distances exceeding the widths of the tracks of magnetic information.

18. A method as defined in claim 15 wherein said time varying signals are applied to a capstan mechanism to change the rotation of the capstan mechanism sufficiently that the transducer crosses said tracks of information irregularly.

19. A method as defined in claim 18 wherein said time varying signals have a frequency exceeding at least ten hertz.

20. A method as defined in claim 18 wherein said tracks of information are disposed diagonally relative to the centerline of the tape.

21. A method as defined in claim 15 wherein said time varying signals have amplitude and frequency sufficient to cause the transducer to cross the tracks of information generally nonperiodically.

22. A method as defined in claim 15 wherein a image field is segmented among several tracks of information.

23. A video record and playback machine of the type which includes a reproduce transducing head to reproduce video information magnetically recorded on a tape in an array of parallel tracks extending across the tape non-parallel to its longitudinal centerline, said machine comprising:

a signal generator to provide time-varying output signals; and means connected to receive the output signals from said signal generator only during shuttling and, in response, to cause non-periodic relative movement between a transducing head and the tape sufficient to alter track-crossing behavior of the transducing head such that the reproduce transducing head crosses tracks of information on the tape generally irregularly, thereby increasing the diversity of video information which is updated in video image fields provided during shuttling.

24. A machine according to claim 23 wherein the means includes a mounting structure for the reproduce transducing head.

25. A machine according to claim 24 wherein said signal generator provides output signals of sufficient magnitude to displace tape relative to the reproduce transducing head by a distance exceeding at least the width of two tracks.

26. A machine according to claim 23 wherein the means includes a capstan mechanism for transporting tape across the reproduce transducing head.

27. A machine according to claim 26 wherein said signal generator provides output signals to alter the rotational velocity of said capstan mechanism sufficiently to cause non-periodic relative displacement of the tape to the transducing head by a distance exceeding the widths of at least two of said tracks of magnetic information.

28. A system for providing non-periodic relative movement between a transducing read head and a videotape upon which image information has been magnetically recorded in an array of parallel tracks extending across the tape non-parallel to its longitudinal centerline, which non-periodic movement alters track-crossing behavior of the transducer only during shuttling to increase the diversity of data sample input points which are updated in a video image field and to, thereby, provide a relatively uniform display of video information during shuttling, comprising:

(a) a transducer mounted to read magnetic tracks of information recorded upon a videotape at an angle to the centerline of the tape;

(b) means to control relative movement between the transducer and the videotape; and (c) signal generating means and switch means that couple the signal generating means to the means to control relative movement between the transducer and the videotape only during shuttling to provide signals that cause relative movement between the transducer and the videotape sufficient to cause the transducer to cross the tracks of magnetic information generally non-periodically to increase the diveristy of data sample input points which are updated in a video image field and to, thereby, provide a relatively uniform display of video information during shuttling.

* * * * *